US008918510B2

(12) United States Patent
Gmach et al.

(10) Patent No.: US 8,918,510 B2
(45) Date of Patent: Dec. 23, 2014

(54) EVALUATION OF CLOUD COMPUTING SERVICES

(75) Inventors: Daniel Juergen Gmach, Palo Alto, CA (US); Jerome Rolia, Kanata (CA); Ludmila Cherkasova, Sunnyvale, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 447 days.

(21) Appl. No.: 13/458,790

(22) Filed: Apr. 27, 2012

(65) Prior Publication Data

US 2013/0290538 A1    Oct. 31, 2013

(51) Int. Cl.
*G06F 15/173* (2006.01)

(52) U.S. Cl.
USPC .......................... 709/226; 709/228; 709/229

(58) Field of Classification Search
None
See application file for complete search history.

(56) References Cited

U.S. PATENT DOCUMENTS

2013/0138816 A1*   5/2013   Kuo et al. ................. 709/226

OTHER PUBLICATIONS

Daniel Gmach, et al., "Workload Analysis and Demand Prediciton of Enterprise Data Center Applications".
Daniel Gmach, et al., "Resource Pool Management: Reactive versus proactive or let's be friends," Computer Networks 53 (2009).
Daniel Gmach, et al., Resource and Virtualization Costs up in the Cloud: Models and Design Choices.
Daniel Gmach, et al., An integrated Approach to Resource Pool Management: Policies, Efficiency and Quality Metrics.
Yuan Chen, et al., Integrated Management of Application Performance, Power and Cooling in Data Centers.
Xiaoyun Zhu, et al., 1000 Islands: Integrated Capacity and Workload Management for the Next Generation Data Center, International Conference on Automonic Computing.
Afgan, "Computation Cost in Grid Computing Environments", University of Alabama, Computer Society, 2007.
Altmann, "Grid Economics and Business Models", Lecture Notes in Computer Science, 2007.
Altmann, "Software Resource Management Considering the Interrelation between Explicit Cost, Energy Consumption, and Implicit Cost", TEMEP, 2010.
Buyya, "Economic Models for Resource Management and Scheduling in Grid Computing", School of Computer Science and Software Engineering, Australia, 2007.
Caracas, "A Pricing Information Service for Grid Computing", IBM Research Labs, Switzerland, 2007.
Garfinkel, "Technical Report TR-08-07: An Evaluation of Amazon's Grid Computing Services: EC2, S3 and SQS", Center for Research on Computation and Society, Harvard.
Gulati, "Cloud Scale Resource Management: Challenges and Techniques", VMware, Inc.
Li, "CloudCmp: Shopping for a Cloud Made Easy", Duke University.
Cherkasova, "R-Opus: A Composite Framework for Application Performability and QoS in Shared Resource Pools", Hewlett-Packard Labs, 2006.

(Continued)

*Primary Examiner* — Viet Vu
*Assistant Examiner* — Keyvan Emdadi

(57) ABSTRACT

At least one embodiment is for a method for estimating resource costs required to process an workload to be completed using at least two different cloud computing models. Historical trace data of at least one completed workload that is similar to the workload to be completed is received by the computer. The processing of the completed workload is simulated using a t-shirt cloud computing model and a time-sharing model. The t-shirt and time-sharing resource costs are estimated based on their respective simulations. The t-shirt and resource costs are then compared.

15 Claims, 5 Drawing Sheets

(56) References Cited

OTHER PUBLICATIONS

Rolia, "A Capacity Management Service for Resource Pools", Hewlett-Packard Labs, 2005.

Tak, "To Move or Not to Move: The Economics of Cloud Computing", Penn State.

Vazquez-Poletti, "A Model for Efficient Onboard Actualization of an Instrumental Cyclogram for the Mars MetNet Mission on a Public Cloud Infrastructure", Madrid, Spain, 2012.

Ward, "A Performance Comparison of Clouds, Amazon EC2 and Ubuntu Enterprise Cloud", SICSA DemoFEST 2009.

Walker, "Benchmarking Amazon EC2 for High-Performance Scientific Computing", Login:vol. 33, No. 5. Oct. 2008.

\* cited by examiner

EVALUATION OF CLOUD COMPUTING SERVICES

BACKGROUND

Enterprises that lack the computing power necessary to process large workloads may use cloud computing services to provide that computing power. Some cloud computing service providers offer their services under a "t-shirt" cloud computing model, while other offer their services under a "time-sharing" cloud computing model.

DESCRIPTION OF THE DRAWINGS

The detailed description will refer to the following drawings, in which.

DETAILED DESCRIPTION

Figure 1:
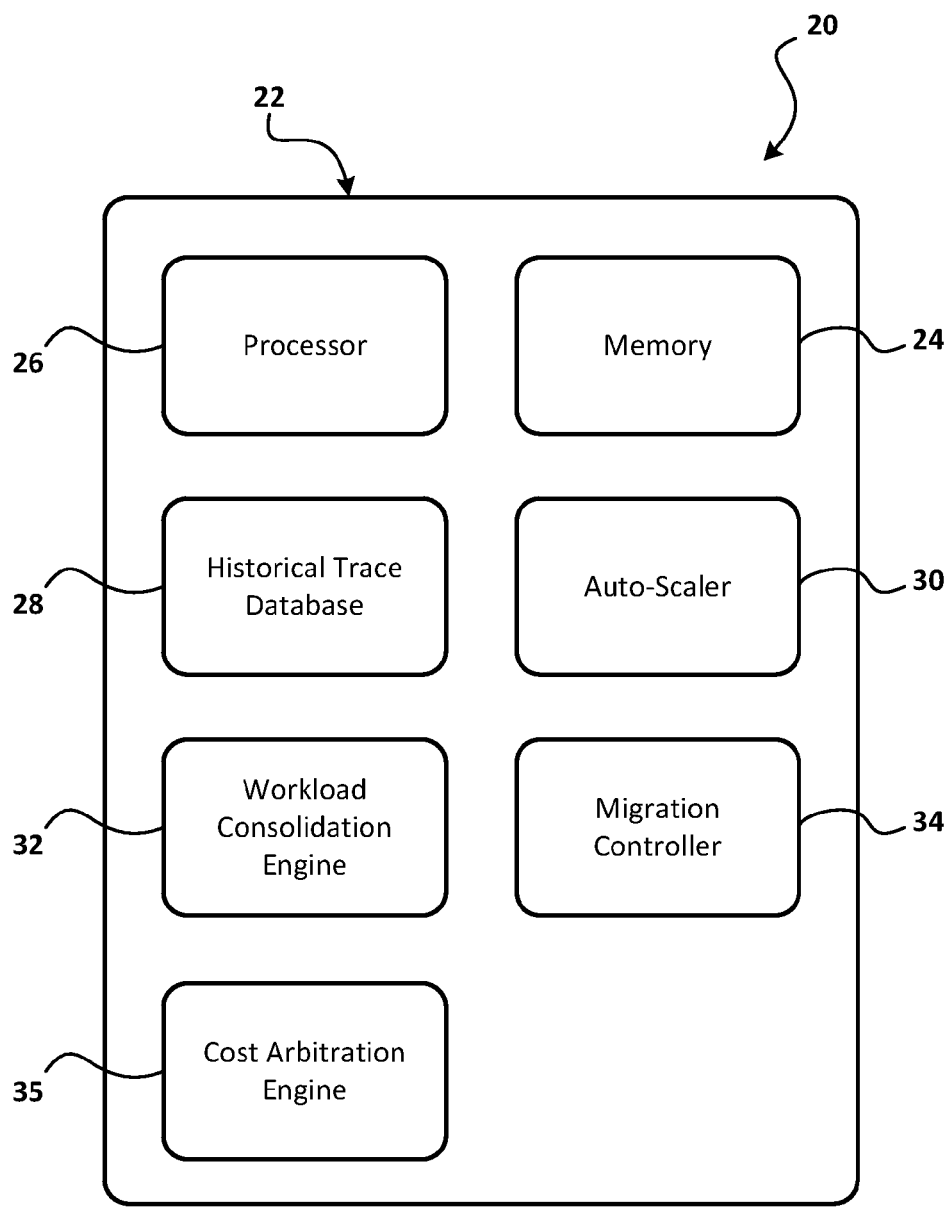
FIG. 1 is a block diagram of an embodiment of a system for evaluating cloud computing services.

Cloud computing, in which customers outsource the processing of their applications or workloads to servers through the internet, has emerged as a new and alternative to processing those applications or workloads in-house, i.e. on their own servers which are often costly to purchase and require much upkeep. Customers are allocated resources from a cloud services provider in the form of Virtual Machines (hereinafter referred to as "VMs"), often at a fraction of the cost of purchasing a server or servers having similar processing capabilities. On those VMs, the customers can process their applications or workloads. Cloud service providers have developed different models that dynamically adjust the resources (typically at least processing power and random access memory (RAM)) provided to the VMs based on the resources demanded by the customers. Typically, cloud providers offer their VM services under a "t-shirt" cloud computing model and/or a "time-sharing" cloud computing model. Each of these models is described in further detail below.

Under the t-shirt cloud computing model, VMs having a wide range of resources (e.g. processing power, memory and disk space) are available by the cloud services provider. The price per hour charged to the customer is roughly proportional to the amount of resources allocated to the customer's VM(s). This model is nicknamed a "t-shirt" model since customers choose the size of his or her VMs to fit his or her needs, much like a clothing shopper chooses an appropriately sized t-shirt, and once the size is chosen, it cannot be adjusted. This approach is hereinafter referred to as a "static t-shirt cloud computing model". Many providers additionally allow the number of fixed resource VMs to be dynamically adjusted to increase the total resources allocated to each VM based on the amount required by that customer. This service is hereinafter referred to as a "dynamic t-shirt cloud computing model." Specifically, an auto-scaler periodically measures the amount of resources demanded by a customer's workload (e.g., every hour) and adjusts quantity of VMs allocated to the customer based on resources demanded.

Under the time-sharing cloud computing models, the number of VMs assigned to a workload is fixed, though the amount of resources (e.g. processing power, memory and disk space) assigned to those VMs may be varied. The fixed number of VMs could be any desirable number. Under a "static time sharing cloud computing model", the VMs remain fixed on one or more servers or other hosts, and each VM remains on its server or host until processing complete. In contrast, under a "dynamic time-sharing cloud computing model", a consolidation engine is employed to minimize the number of servers needed to host all workloads while also satisfying each workload's time varying resource demands. Specifically, the workload consolidation engine arranges VM workloads within a resource pool, and if needed, dynamically initiates workload migrations at predetermined intervals, e.g., every four hours, between physical servers or hosts. This is distinguished from the static time-sharing cloud computing model, in which workloads are not migrated across physical servers or hosts.

Yet another cloud computing model, hereinafter referred to as a "dynamic hybrid cloud computing model" is a combination of the dynamic t-shirt cloud computing model and the dynamic time-sharing cloud computing model. The dynamic hybrid cloud computing model uses both the auto-scaler to dynamically adjust the number of VMs allocated to a workload as well as the resources allocated to those VMs and a consolidation engine to minimize the number of servers needed to host all the workloads.

Case studies of the processing of different types of workloads using the t-shirt and time-sharing cloud computing models have shown that most workloads can be processed more efficiently (i.e., with less resources) under the time-sharing model. However, some workloads, such as workloads that fit a t-shirt size very well with respect to multiple resources (e.g. processing power, memory, networking bandwidth and storage demand) or workloads that exhibit relatively stable resource demands within the auto-scaler intervals (e.g., every hour) can be processed more efficiently under one of the t-shirt cloud computing models. Customers are often unsure which of the cloud computing models would be more efficient to process their respective workloads.

FIG. 1 illustrates an example system 20 for comparing the resource costs of hosting a workload in at least a t-shirt cloud computing model and a time-sharing cloud computing model. The system 20 includes at least one computer 22, which alternately may be a server or a cluster if desired, having a computer-readable memory 24 and a processor 26. The computer 22 includes a historical workload trace database 28 which receives, reads and stores the historical trace data of at least one completed workload, which is provided by at least one customer. The historical trace data may include traces taken at predetermined intervals (e.g. five minutes) of the processing power, memory 24 and other resources used by the server during the processing of the completed workload.

The computer 22 analyzes the historical trace data of a completed workload that is similar to a workload to be completed. For example, the processed and to be completed workloads may require similar mean processing powers, peak processing powers, mean memory 24 and peak memory 24 during processing. Additionally, the completed and the to be completed workloads may have a similar burstiness.

The computer 22 also simulates the processing of the to be completed workload using a static t-shirt cloud computing model, wherein the number of fixed resource VMs assigned the workload remains constant. The resources, such as processing power and memory, assigned to the VMs remain constant through the processing of the workload. The number of fixed resource VMs and the resources allocated to those VMs are preferably determined based on the peak resource demands of the workload.

The computer 22 also simulates the processing of the to be completed workload using a dynamic t-shirt cloud computing model wherein an auto-scaler 30 dynamically varies the number of fixed resource VMs at predetermined intervals (e.g. every hour) according to demand. Based on the simulation, the computer 22 determines a dynamic t-shirt resource cost which is based at least partially on the quantity of resources used and the duration of use. The number of physical servers assigned to the workload is determined based on the peak number of VMs required over the simulated time interval.

The computer 22 additionally simulates the processing of the to be completed workload using a static time-sharing cloud computing model wherein a fixed number of VMs have resources (e.g. processing power, memory, disk space) which are adjusted at predetermined intervals (e.g. every hour) according to demand. Based on the simulation, the computer 22 generates a static time-sharing resource cost which is based at least partially on the quantity of resources used during the simulation and the duration of use.

Further, the computer 22 simulates the processing of the to be completed workload using a dynamic time-sharing cloud computing model wherein a workload consolidation engine 32 arranges workloads within a resource pool to minimize the number of servers in operation while also satisfying each workload's time-varying resource demands. The computer 22 may additionally include a migration controller 34 which uses recent information from the historical trace data or the output of the workload consolidation engine to migrate the workload to different servers when necessary, thereby further increasing the efficiency of the processing of the workload. Based on the simulation, the computer 22 determines a dynamic time-sharing resource cost. The computer 22 additionally employs a cost arbitration engine 35 to divide the physical costs, such as power, management, license costs, etc. among the customers based on their respective workloads being processed. The cost arbitration engine 35 may also take into account the impact of a workload's burstiness on the number of physical machines.

The computer 22 may additionally simulate the processing of the to be completed workload using a dynamic hybrid cloud computing model. In the dynamic hybrid, an auto-scaler 30 dynamically adjusts the number of VMs allocated to the workload and the resources of those VMs based on demand, a workload consolidation engine 32 arranges workloads within a resource pool to minimize the number of servers in operation while also satisfying each workload's time varying demands, and a migration controller 34 which uses recent information from the historical trace data to migrate the workload to different servers when necessary.

The computer 22 further compares the static t-shirt resource cost, the dynamic t-shirt resource cost, the static time-sharing resource cost, the dynamic time-sharing resource cost and the dynamic hybrid resource cost to determine which of the cloud computing models will be more efficient at processing the to be completed workload. Further, the computer 22 may determine final static t-shirt, dynamic t-shirt, static time-sharing, dynamic time-sharing and dynamic hybrid final prices based on the respective resource costs and the amount at least one cloud provider charges to supply the resource costs. Thus, the computer 22 not only allows the customer to determine which of the cloud computing models is more efficient, but it also directs the customer to the least costly cloud computing provider, thereby saving the customer money.

Figure 2:
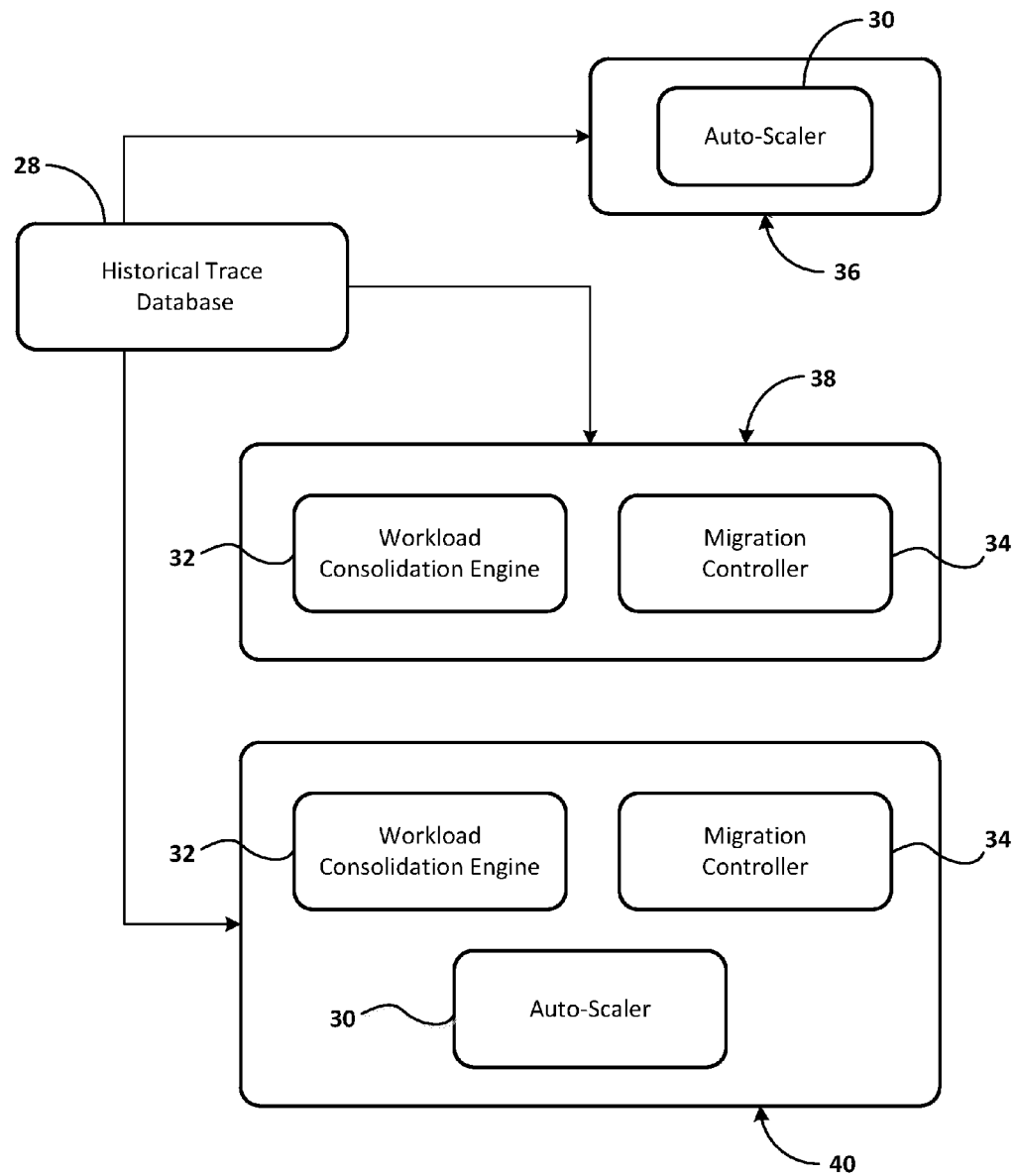
FIG. 2 is another block diagram of an embodiment of a system for evaluating cloud computing services.

FIG. 2 illustrates another example system wherein the historical trace database is in communication with a dynamic t-shirt simulator 36, a dynamic time-sharing simulator 38 and a dynamic hybrid simulator 40. The dynamic t-shirt simulator 36 includes an auto-scaler 30 for dynamically varying the number of VMs at predetermined intervals (e.g. every hour) according to demand when simulating the processing of the to be completed workload with the dynamic t-shirt cloud computing model. The dynamic t-shirt simulator 36 may also include a consolidator (not shown) for consolidating VMs on one or more computers or other servers.

The dynamic time-sharing simulator 38 includes a workload consolidation engine 32 for arranging workloads within a resource pool to minimize the number of servers in operation while also satisfying each workload's time-varying resource demands and a migration controller 34 for using recent information from the historical trace data to migrate the workload to different servers when necessary, thereby further increasing the efficiency of the processing of the workload. The static time-sharing simulator 38 may additionally include a scaler for dynamically adjusting the resources allocated to a fixed number of VMs.

The dynamic hybrid simulator 40 includes all three of the auto-scaler 30, workload consolidation engine 32, and the migration controller 34. Thus, the dynamic hybrid simulator 40 can vary the number of VMs and the resources allocated those VMs according to demand and also efficiently arrange the workloads on one or more servers.

Figure 3:
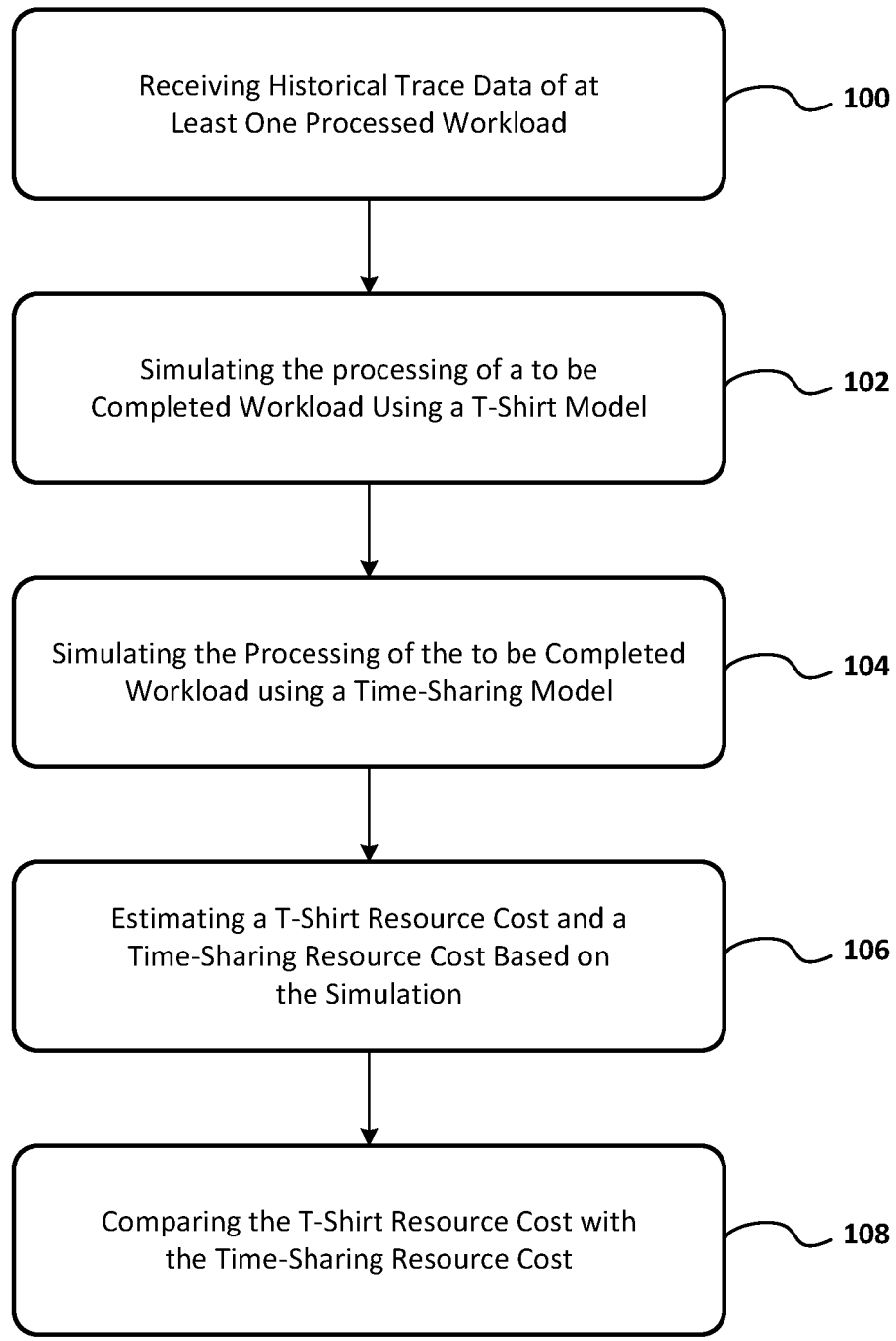
FIG. 3 is a flow diagram of an embodiment of a method of evaluating cloud computing services.

FIG. 3 is a flow diagram of an embodiment of a method to evaluate cloud computing services. The method, when executed, provides an estimate of resource costs to process a to be completed workload using at least two different cloud computing models as executed on a suitably programmed computer 22, such as the system 20 of FIG. 1, having a processor 26 and a computer readable memory 24. In FIG. 3, the method begins by receiving 100 with the computer 22 the historical trace data of at least one processed workload that was processed by at least one server and is similar (e.g. similar peak and mean processing power; peak and mean memory; and burstiness) to the to be completed workload. The historical data may be read into the computer-readable memory 24 of the computer 22. The historical trace data may be supplied by a customer and is read into a historical workload trace database 28 of the computer 22.

The method continues with simulating 102 with the computer 22 the processing of the to be completed workload using a t-shirt cloud computing model applied to the historical trace data. The to be completed workload could be simulated either with the static t-shirt cloud computing model or the dynamic t-shirt cloud computing model. If the dynamic t-shirt cloud computing model is employed, then an auto-scaler 30 may dynamically vary the number of virtual machines allocated to the to be completed workload at predetermined intervals, e.g., every hour, according to demand.

The method proceeds with simulating 104 with the computer 22 the processing of the to be completed workload using a time-sharing cloud computing model applied to the historical trace data. The simulating with the time-sharing cloud computing model may include a workload consolidation engine 32 which arranges workloads within a resource pool and/or a migration controller 34 which uses recent information from the historical trace data to migrate workloads to different servers when necessary, thereby further increasing each server's efficiency. The time-sharing cloud computing model employed could either be a static time-sharing cloud computing model or a dynamic time-sharing cloud computing model.

Based on the simulations, the method continues with estimating 106 a t-shirt resource cost and a time-sharing resource cost based on the simulations of the to be completed workload using the t-shirt cloud computing model and the time-sharing cloud computing model respectively. The method then moves on with comparing 108 the t-shirt resource cost to the time-sharing resource cost to determine which is the more efficient cloud computing model to process the to be completed workload. The method may also include estimating a t-shirt final price based on the estimated t-shirt resource cost and the price at least one cloud provider charges to supply the t-shirt resource cost and estimating a time-sharing final price based on time-sharing resource cost and the price at least one cloud provider charges to supply the time-sharing resource cost.

Figure 4:
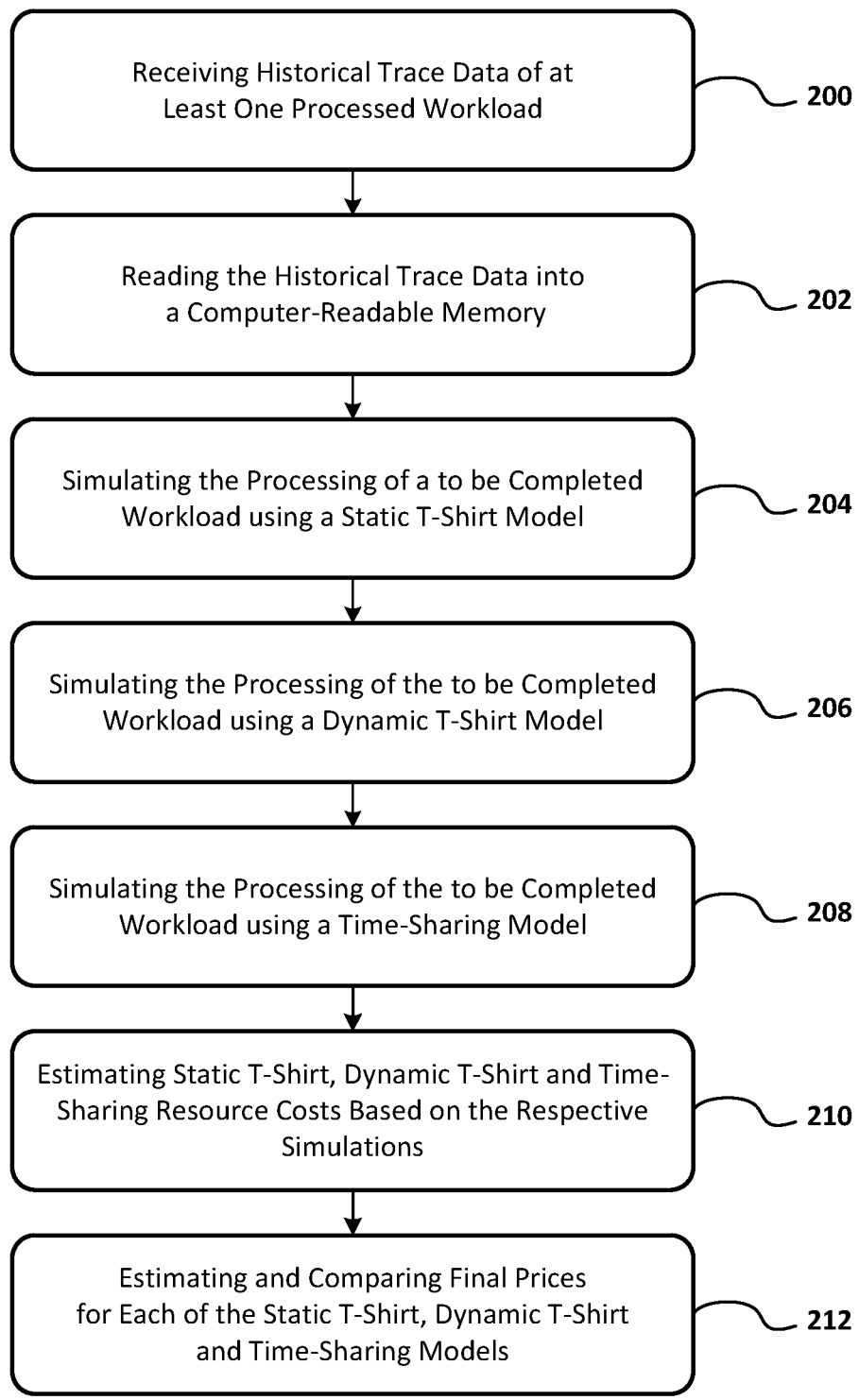
FIG. 4 is a flow diagram of another embodiment of a method of evaluating cloud computing services.

FIG. 4 is a flow chart of another exemplary method for estimating resource costs to process a to be completed workload using at least two different cloud computing models as executed on a suitably programmed computer, such as the computer 22 of FIG. 1, having a processor 26 and a computer readable memory 24.

The example method of FIG. 4 includes receiving 200 with the computer 22 the historical trace data of at least one processed workload that was processed by at least one server and is similar to the to be completed workload. The method continues with reading 202 the historical trace data into the computer-readable memory 24. The method proceeds with simulating 204 with the computer 22 the processing of the computing using a static t-shirt cloud computing model. In the static t-shirt cloud computing model, the number of VMs and the resources of the VMs are fixed and based on the peak processing power and peak memory demanded during the processing of the to be completed workload. The method proceeds with simulating 206 with the computer 22 the processing of the to be completed workload using a dynamic t-shirt cloud computing model. In the dynamic t-shirt cloud computing model, the number of fixed-resource VMs allocated to the workload is dynamically adjusted. The method additionally includes simulating 208 with the computer 22 the processing of the to be completed workload using a time-sharing cloud computing model. In the time-sharing cloud computing model, a number of workloads are arranged within a resource pool and migrated between different servers when necessary to further increase the system's efficiency.

Once the simulations are complete, the method proceeds with estimating 210 a static t-shirt resource cost, a dynamic t-shirt resource cost and a time-sharing resource cost based on the simulations using the static t-shirt, dynamic t-shirt and the time-sharing cloud computing models respectively. The method continues with estimating 212 and comparing final prices for the static t-shirt, dynamic t-shirt and time-sharing cloud computing models based on the respective resource costs and the prices charged by at least one cloud services provider to provide those resources. Thus, this exemplary method assists a customer in determining the most efficient cloud computing model on which to process his or her workload and the least costly cloud services provider.

Figure 5:
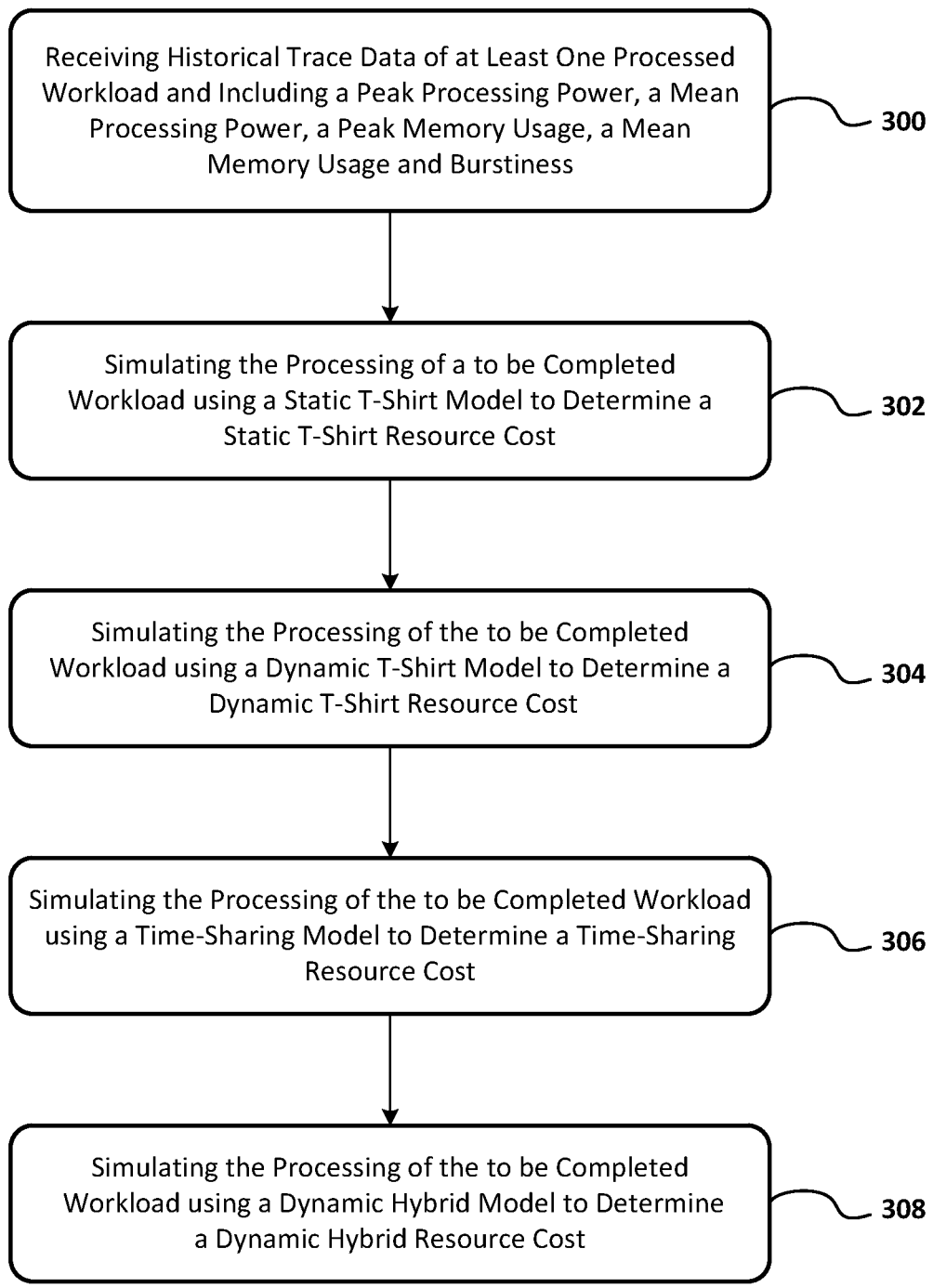
FIG. 5 is a flow diagram of yet another exemplary process of evaluating different cloud computing models.

Referring now to FIG. 5, a flow chart is provided showing yet another example method for estimating resource costs to process a to be completed workload using at least two different cloud computing models as executed on a suitably programmed computer 22, such as the system 20 of FIG. 1, having a processor 26 and a computer readable memory 24. The method includes receiving 300 historical trace data of at least one completed workload. The historical trace data includes at least a peak processing power, a mean processing power, a peak memory usage, a mean memory usage and a burstiness.

Next, the method proceeds with simulating 302 the processing of the to be completed workload using a static t-shirt cloud computing model to determine a static t-shirt resource cost. The method then continues with simulating 304 the processing of the completed workload using a dynamic t-shirt cloud computing model to determine a dynamic t-shirt resource cost. Further, the method includes simulating 306 the processing of the to be completed workload using a dynamic time-sharing cloud computing model to determine a dynamic time-sharing resource cost. Next, the method includes simulating 308 with the computer the processing of the to be completed workload using a dynamic hybrid cloud computing model to determine a dynamic hybrid resource cost. If desired, the method may proceed with comparing the static t-shirt, dynamic t-shirt, dynamic time-sharing and dynamic hybrid resource costs to determine which of the four simulated processes would be most efficient for processing the to be completed workload.

We claim:

1. A method for estimating by a server, cloud computing resource costs required to process a workload to be completed, comprising:
   receiving at the server historical trace data of at least one processed workload that is similar to the workload to be completed;
   simulating processing of the to be completed workload using a t-shirt cloud computing model applied to the historical trace data;
   estimating a t-shirt resource cost based on the simulation of the completed workload using the t-shirt cloud computing model;
   simulating the processing of the to be completed workload using a time-sharing cloud computing model applied to the historical data;
   estimating a time-sharing resource cost based on the simulation of the completed workload using the time-sharing cloud computing model;
   and comparing the t-shirt resource cost to the time-sharing resource cost to determine the more efficient cloud computing model to process the to be completed workload.

2. The method as set forth in claim 1 further comprising analyzing the historical trace data with the computer to determine at least the peak processing power, the mean processing power, the peak memory, and the mean memory employed by the at least one server during the processing of the completed workload and to determine a burstiness of the processed workload.

3. The method as set forth in claim 2 wherein simulating the to be completed workload with the t-shirt cloud computing model is further defined as simulating the processing of the to be completed workload with a dynamic t-shirt cloud computing model wherein an auto-scaler dynamically adjusts a number of fixed sized virtual machines according to the amount of resources required during the processing of the completed workload.

4. The method as set forth in claim 1 wherein simulating the processing of the to be completed workload with the time-sharing cloud computing model is further defined as simulating the processing of the to be completed workload with a dynamic time-sharing cloud computing model wherein a consolidation machine dynamically consolidates the workload being simulated with at least one other workload on at least one server to minimize the number of servers in operation and dynamically adjusts the processing power and memory of a fixed number of virtual machines.

5. The method as set forth in claim 1 further including estimating with the computer a t-shirt final price for at least one cloud provider based on the estimated t-shirt resource cost and the price that the cloud provider charges to supply the estimated t-shirt resource cost and estimating with the computer a time-sharing final price for at least one cloud provider based on the estimated time sharing resource cost and the price that the cloud provider charges to supply the estimated time-sharing resource cost under the time-sharing cloud computing model.

6. The method as set forth in claim 5 further including simulating the processing of the to be completed workload with a dynamic hybrid cloud computing model wherein an auto-scaler dynamically adjusts the number of virtual machines, the processing power of the virtual machines, and the memory of those virtual machines according to the amount of resources required during the processing of the completed workload and wherein a consolidation machine dynamically consolidates the workload with at least one other workload on at least one server and further including estimating a dynamic hybrid resource cost based on the simulation of the to be completed workload using the dynamic time-sharing cloud computing model.

7. The method as set forth in claim 6 further including estimating with the computer a dynamic hybrid final price based on the estimated dynamic hybrid resource cost and the price that the cloud provider charges to supply the estimated dynamic hybrid resource cost.

8. A computer having a processor and a non-transitory computer readable storage medium encoded with a computer program, the program comprising instructions that, when executed by the processor, cause the processor to:
    receive historical trace data of at least one processed workload that is similar to a to be completed workload;
    read the historical trace data;
    simulate the processing of the to be completed workload using a t-shirt cloud computing model applied to the historical trace data;
    estimate a t-shirt resource cost to process the to be completed workload based on the simulation using a t-shirt cloud computing model;
    simulate the processing of the to be completed workload using a time-sharing cloud computing model applied to the historical trace data;
    estimate a time-sharing resource cost based on the simulation of the completed workload using the time-sharing cloud computing model; and
    compare the t-shirt resource cost to the time-sharing resource cost to determine the more efficient cloud computing model on which to process the to be completed workload.

9. The system as set forth in claim 8 wherein the historical trace data includes at least the peak processing power, the mean processing power, the peak memory, and the mean memory employed by at least one server to process the completed workload and the bustiness of the processed workload during its processing.

10. The system as set forth in claim 9 wherein the processor determines the resource cost to use an auto-scaler to dynamically adjust the number of fixed resource virtual machines to estimate a dynamic t-shirt resource cost.

11. The system as set forth in claim 10 wherein the processor simulates a consolidation machine dynamically consolidating the to be completed workload with at least one other workload on at least one server.

12. The system as set forth in claim 11 wherein the processor further estimates a dynamic t-shirt final price for at least one cloud provider based on the estimated dynamic t-shirt resource cost and the price that the cloud provider charges to supply the estimated dynamic t-shirt cost and estimates a time-sharing final price for at least one cloud provider based on the estimated time sharing resource cost and the price that the cloud provider charges to supply the time sharing resource cost.

13. The system as set forth in claim 12 wherein the processor further simulates the processing of the to be completed workload using a dynamic hybrid cloud computing model wherein an auto-scaler dynamically adjusts the number of virtual machines, the processing power of the virtual machines, and the memory of the virtual machines to the amount of resources required during the processing of the to be completed workload and wherein a consolidation machine dynamically consolidates the workload with at least one other workload on at least one server.

14. The system as set forth in claim 13 wherein the processor further estimates a dynamic hybrid final price for at least one cloud provider based on the estimated dynamic hybrid resource cost and the price that the cloud provider charges to supply the dynamic hybrid resource cost.

15. A method, executed on a suitably programmed computer having a non-transitory computer-readable memory, for estimating resource costs required to process a to be completed workload using four different cloud computing models, comprising the steps of:
    receiving historical trace data of at least one processed workload that has a similar peak processing power, mean processing power, peak memory, mean memory and burstiness as the to be completed workload;
    simulating the processing of the to be completed workload using a static T-shirt cloud computing model, wherein a fixed number of fixed resource virtual machines are chosen to satisfy the peak demand of the to be completed workload;
    simulating the processing of the to be completed workload using a dynamic T-shirt cloud computing model, wherein an auto-scaler dynamically adjusts the number of fixed resource virtual machines to determine a dynamic t-shirt resource cost;
    simulating with the computer the processing of the to be completed workload using a dynamic time-sharing cloud computing model, wherein a consolidation machine dynamically consolidates the to be completed workload with at least one other workload on at least one server to determine a time-sharing resource cost; and
    simulating with the computer the processing of the to be completed workload using a dynamic hybrid cloud computing model, wherein an auto-scaler dynamically adjusts the number of virtual machines and wherein a consolidation machine dynamically consolidates the to be completed workload with at least one other workload on at least one server to determine a dynamic hybrid resource cost.

* * * * *